United States Patent
Kwan et al.

(10) Patent No.: US 10,558,703 B2
(45) Date of Patent: Feb. 11, 2020

(54) SIGNAL-TO-NOISE RATIO IMAGE VALIDATION

(71) Applicant: NCR Corporation, Atlanta, GA (US)

(72) Inventors: Sik Piu Kwan, Suwanee, GA (US); Yoshitaka Utsumi, Kamakura (JP)

(73) Assignee: NCR Corporation, Atlanta, GA (US)

( * ) Notice: Subject to any disclaimer, the term of this patent is extended or adjusted under 35 U.S.C. 154(b) by 124 days.

(21) Appl. No.: 15/870,264

(22) Filed: Jan. 12, 2018

(65) Prior Publication Data

US 2018/0137120 A1 May 17, 2018

Related U.S. Application Data

(63) Continuation of application No. 14/264,888, filed on Apr. 29, 2014, now Pat. No. 9,870,377.

(51) Int. Cl.
| | |
|---|---|
| *G06Q 20/00* | (2012.01) |
| *G06K 7/10* | (2006.01) |
| *G06F 16/51* | (2019.01) |
| *G06F 16/583* | (2019.01) |
| *G07G 1/00* | (2006.01) |
| *G06Q 20/20* | (2012.01) |
| *G06K 9/40* | (2006.01) |

(52) U.S. Cl.
CPC ............ *G06F 16/51* (2019.01); *G06F 16/583* (2019.01); *G06K 9/40* (2013.01); *G06Q 20/208* (2013.01); *G07G 1/0054* (2013.01)

(58) Field of Classification Search
None
See application file for complete search history.

(56) References Cited

U.S. PATENT DOCUMENTS

| | | |
|---|---|---|
| 6,565,003 B1 | 5/2003 | Ma |
| 8,251,290 B1 | 8/2012 | Bushman |
| 2007/0205284 A1 | 9/2007 | Ross |
| 2007/0262149 A1 | 11/2007 | Knowles |
| 2012/0048937 A1* | 3/2012 | Dahari ..................... G06K 7/14 235/462.08 |
| 2012/0301009 A1 | 11/2012 | Dabic |
| 2013/0195373 A1 | 8/2013 | Shibata |

* cited by examiner

*Primary Examiner* — Ariel J Yu
(74) *Attorney, Agent, or Firm* — Schwegman, Lundberg & Woessner

(57) ABSTRACT

An image is compared to a validation image to obtain a signal-to-noise ratio. The signal-to-noise ratio is used to determine validity of the image. According to an embodiment, the image includes a barcode. According to another embodiment, a minimum threshold value for the signal-to-noise ratio is set and the validity of the image is determined based on the minimum threshold value and the signal-to-noise ratio. The minimum threshold value can be determined by using respective signal-to-noise ratios resulting from comparing a valid image to a validation image and an invalid image to a validation image.

14 Claims, 7 Drawing Sheets

SIGNAL-TO-NOISE RATIO IMAGE VALIDATION

BACKGROUND

A major issue facing retailers today is theft. According to some estimates, theft of retail goods costs retailers up to billions of dollars every year.

One type of retail theft is called barcode-swapping. In this type of theft, a thief legally purchases a relative cheap product and removes the barcode. The thief then returns to the store and replaces a barcode on a more expensive product with the cheaper product barcode. When the thief goes to pay for the more expensive product, the scanner picks up the cheaper barcode and the theft is the discount between the two products.

In order to attempt to prevent barcode-swapping, retailers have used a variety of measures. One example is that retailers have resorted to using checkout clerks to eyeball the product as it comes across the scanner. Additionally, retailers have required guests to present a receipt at the door, where a security person compares the receipt to the purchased items. Finally, retailers have tried using humans to identify interesting aspects of a design of a product to check for barcode-swapping. With the rise of self-service terminals, solutions involving human verification cannot keep up with technology advances. Finally, the current solutions have shortcomings in speed, cost, or reliability or undesirably rely on human inputs or verifications.

SUMMARY

In various embodiments, methods and systems for image validation are presented.

According to an embodiment, a method for determining validity of an image is provided. Specifically, in an embodiment, an image is compared to a validation image to obtain a signal-to-noise ratio. Finally, the validity of the image is determined from the signal-to-noise ratio.

DETAILED DESCRIPTION

Figure 1:
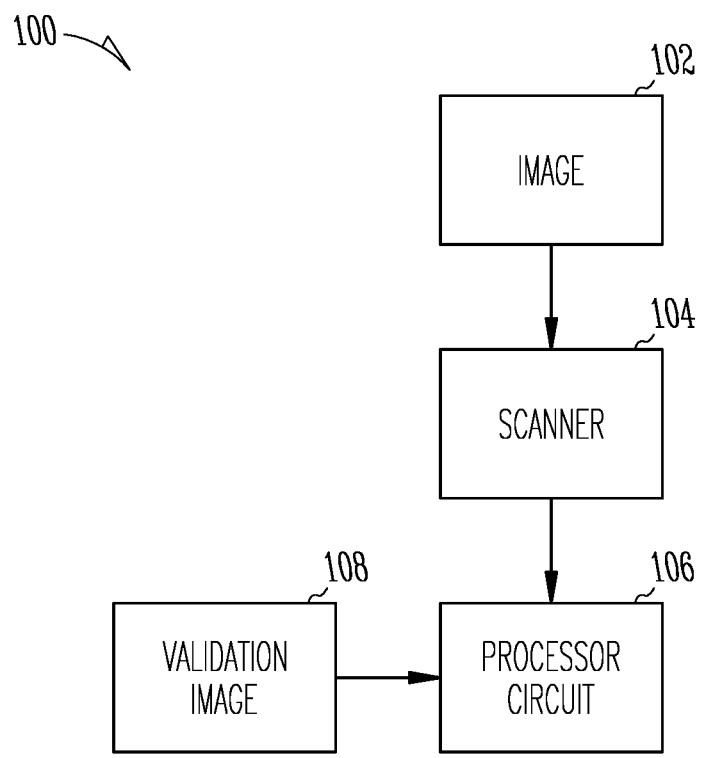
FIG. 1 illustrates generally an example of a system for determining validity of an image, such as including an image, a scanner, a validation image, and a processor circuit.

FIG. 1 illustrates generally an example of a system 100, such as can be used for determining validity of an image. Various components of the system 100 are programmed and reside within memory or a non-transitory computer-readable medium and execute on one or more processors of one or more devices. The system 100 has access to and can communicate over one or more networks, and the networks can be wired, wireless, or a combination of wired and wireless.

The system 100 can include an image 102 and a scanner 104 used to obtain the image 102. In an example, the scanner 104 can send the image 102 to a processor circuit 106. The processor circuit 106 can compare the image 102 and a validation image 108. In an example, the processor circuit 106 can obtain a signal-to-noise ratio from the comparison of the image 102 and the validation image 108. The resulting signal-to-noise ratio can be used by the processor circuit 106 to determine validity of the image 102. In an example, the image 102 can include a barcode, a Quick Response (QR) code, or the like. The image 102 can include other information, such as a Price Look-Up (PLU) code. The image 102 can also be cropped at the scanner or by the processor circuit 106. In an example, the validation image 108 can include a barcode, a Quick Response (QR) code, or the like. The validation image 108 can include other information, such as a Price Look-Up (PLU) code. The processor circuit 106 can use a minimum threshold value for the signal-to-noise ratio to determine the validity of the image 102.

In an example, the processor circuit 106 can include comparing the image 102 to the validation image 108 and obtaining more than one signal-to-noise ratio. The processor circuit 106 can also include determining validity of the image 102 from more than one signal-to-noise ratio. In an example, the processor circuit 106 can include comparing the image 102 to more than one validation image. The processor circuit 106 can include obtaining more than one signal-to-noise ratio. The processor circuit 106 can include determining a central tendency of the more than one signal-to-noise ratio. Determining validity of the image 102 can comprise using the central tendency.

The system 100 can include a device having the scanner 104 and the processor circuit 106. In an example, the system 100 can include generating the image 102. The scanner 104 can include generating the image 102. The system 100 can include generating the validation image 108. The system 100 can include comparing a portion of the image 102 to a portion of the validation image 108.

The system 100 can include manipulating the image 102 to reduce glare. In an example, the system 100 can manipulate the validation image 108 to reduce glare. The system 100 can include setting a resolution for the image 102. The system 100 can include setting a resolution for the validation image 108. In an example, the system 100 can set a resolution for the image 102 prior to obtaining the signal-to-noise ratio. The system 100 can include receiving a user setting for the resolution.

Figure 2:
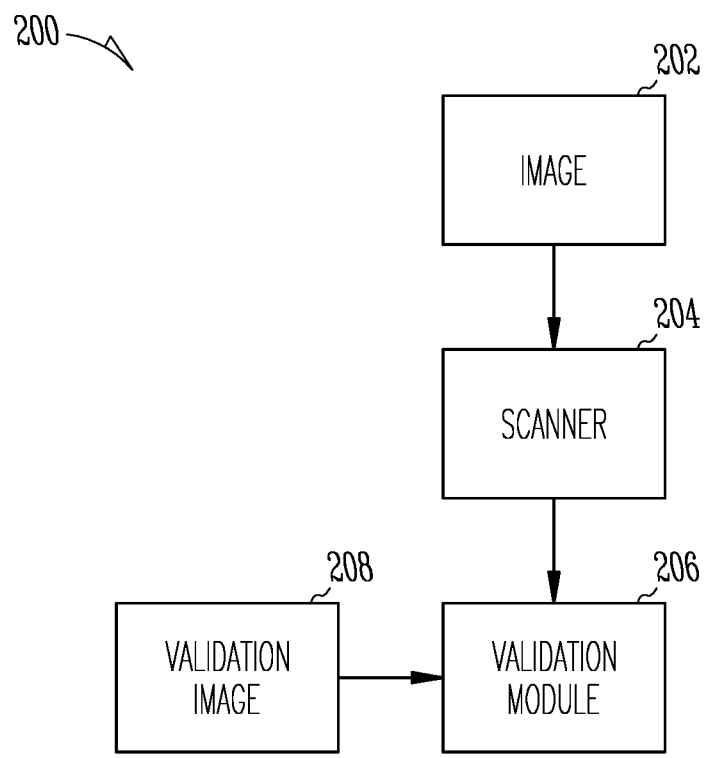
FIG. 2 illustrates generally an example of a system for determining validity of an image, such as including an image, a scanner, a validation image, and a validation module.

FIG. 2 illustrates generally an example of a system 200, such as can be used for determining validity of an image. Various components of the system 200 are programmed and reside within memory or a non-transitory computer-readable medium and execute on one or more processors of one or more devices. The system 200 has access to and can communicate over one or more networks; and the networks can be wired, wireless, or a combination of wired and wireless.

The system can include an image 202 and a scanner 204 used to obtain the image 202. In an example, the scanner 204 can send the image 202 to a validation module 206. The validation module 206 can compare the image 202 and a validation image 208. In an example, the validation module 206 can obtain a signal-to-noise ratio from the comparison of the image 202 and the validation image 208. The resulting signal-to-noise ratio can be used by the validation module 206 to determine validity of the image 202. In an example, the image 202 can include a barcode, a Quick Response (QR) code, or the like. The image 202 can include other information, such as a Price Look-Up (PLU) code. The image 202 can also be cropped at the scanner 204 or by the validation module 206. The validation module 206 can use a minimum threshold value for the signal-to-noise ratio to determine the validity of the image 202.

Figure 3:
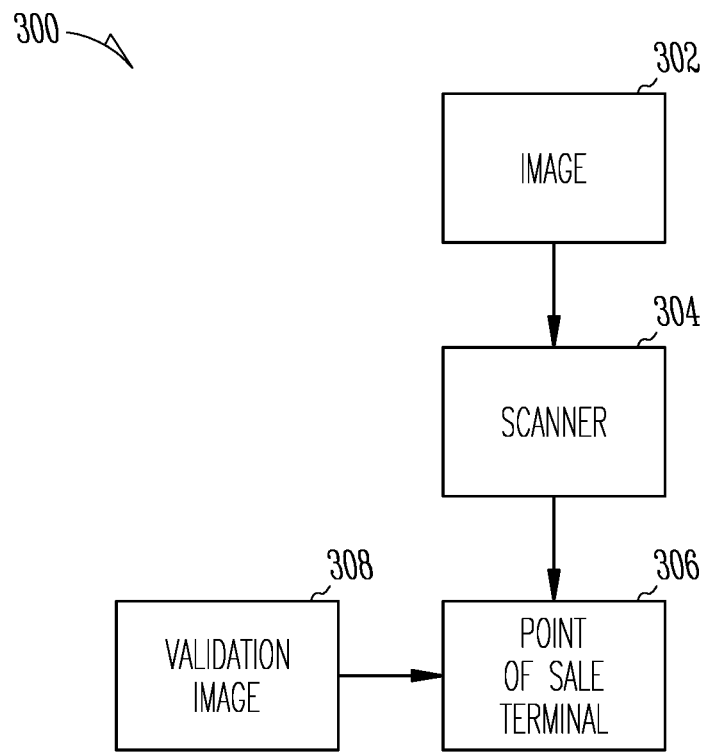
FIG. 3 illustrates generally an example of a system for determining validity of an image, such as including an image, a scanner, a validation image, and a Point Of Sale (POS) terminal.

FIG. 3 illustrates generally an example of a system 300, such as can be used for determining validity of an image. Various components of the system 300 are programmed and reside within memory or a non-transitory computer-readable medium and execute on one or more processors of one or more devices. The system 300 has access to and can communicate over one or more networks; and the networks can be wired, wireless, or a combination of wired and wireless.

The system can include an image 302 and a scanner 304 used to obtain the image 302. In an example, the scanner 304 can send the image 302 to a Point Of Sale (POS) terminal 306. In an example, the POS terminal 306 can include the scanner 304. The POS terminal 306 can compare the image 302 and a validation image 308. In an example, the POS terminal 306 can obtain a signal-to-noise ratio from the comparison of the image 302 and the validation image 308. The resulting signal-to-noise ratio can be used by the POS terminal 306 to determine validity of the image 302. In an example, the image 302 can include a barcode, a Quick Response (QR) code, or the like. The image 302 can include other information, such as a Price Look-Up (PLU) code. The image 302 can also be cropped at the scanner 304 or by the POS terminal 306. The POS terminal 306 can use a minimum threshold value for the signal-to-noise ratio to determine the validity of the image 302. In an example the POS terminal 306 can include kinds of terminals, such as a Self-Service Terminal (SST), a cashier assisted checkout terminal, or any other type of terminal.

In an example, the system 300 can include setting a minimum threshold value for the signal-to-noise-ratio. The POS terminal 306 can use a minimum threshold value for the signal-to-noise ratio to determine the validity of the image 302. The minimum threshold value can include being set by a user. In an example, the system 300 can include generating the image 302. The scanner 304 can include generating the image 302. In an example, the system 300 can include generating the image 302 at the POS terminal 306.

Figure 4:
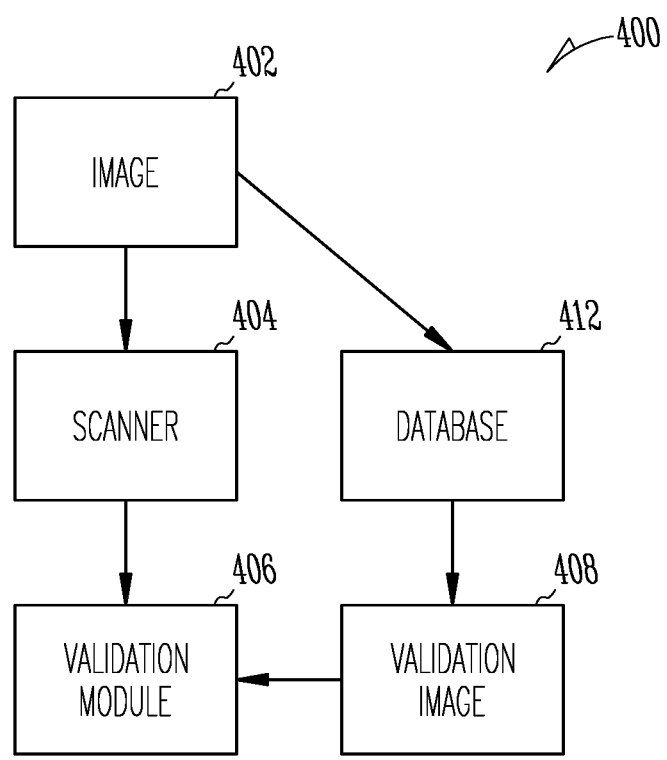
FIG. 4 illustrates generally an example of a system for determining validity of an image, such as including an image, a scanner, a database, a validation image, and a validation module.

FIG. 4 illustrates generally an example of a system 400, such as can be used for determining validity of an image. Various components of the system 400 are programmed and reside within memory or a non-transitory computer-readable medium and execute on one or more processors of one or more devices. The system 400 has access to and can communicate over one or more networks; and the networks can be wired, wireless, or a combination of wired and wireless.

The system can include an image 402 and a scanner 404 used to obtain the image 402. In an example, the scanner 404 can send the image 402 to a validation module 406. The validation module 406 can compare the image 402 and a validation image 408. In an example, the validation module 406 can obtain a first signal-to-noise ratio from the comparison of the image 402 and the validation image 408. The resulting first signal-to-noise ratio can be used by the validation module 406 to determine validity of the image 402. In an example, the image 402 can include a barcode, a Quick Response (QR) code, or the like. The image 402 can include other information, such as a Price Look-Up (PLU) code. The image 402 can also be cropped at the scanner 404 or by the validation module 406.

In an example, the system 400 can include sending the image 402 to a database 412. The image 402 can include a validation image 408. In an example the validation module 406 can compare the image 402 to a second validation image to obtain a second signal-to-noise ratio. The validation module 406 can use the first signal-to-noise ratio and the second signal-to-noise ratio to determine validity of the image 402.

In an example, the system 400 can include setting a minimum threshold value for the signal-to-noise-ratio. The validation module 406 can use a minimum threshold value for the signal-to-noise ratio to determine the validity of the image 402. In an example, the validation module 406 can include determining the minimum threshold value. The system 400 can comprise images known to have certain characteristics, such as a valid image, an invalid image, an image with a specified resolution, or the like. In an example, the validation module 406 can include using the valid image and the invalid image to determine the minimum threshold value. The validation module 406 can include comparing the valid image to a validation image 408 to obtain a valid image signal-to-noise ratio. Also, the validation module 406 can include comparing the invalid image to a validation image 408 to obtain an invalid image signal-to-noise ratio. In an example, the validation module 406 can include determining the minimum threshold value using the valid image signal-to-noise ratio and the invalid image signal-to-noise ratio. Determining the minimum threshold value can include setting the minimum threshold value to a value less than the valid image signal-to-noise ratio but not less than the invalid image signal-to-noise ratio. In an example, the validation module 406 can include comparing the valid image to a validation image 408 to obtain more than one valid image signal-to-noise ratios. In an example, the validation module 406 can include comparing more than one valid image to a validation image 408 to obtain more than one valid image signal-to-noise ratios. In an example, the validation module 406 can include comparing the invalid image to a validation image 408 to obtain more than one invalid image signal-to-noise ratios. In an example, the validation module 406 can include comparing more than one invalid image to a validation image 408 to obtain more than one invalid image signal-to-noise ratios. In an example, the validation module 406 can include comparing a valid image to more than one validation image 408 to obtain more than one valid image signal-to-noise ratios. In an example, the validation module 406 can include comparing an invalid image to more than one validation image 408 to obtain more than one invalid image signal-to-noise ratios. In an example, the validation module 406 can include determining the minimum threshold value from at least one valid image and at least one invalid image, such as by using at least one valid image signal-to-noise ratio and at least one invalid image signal-to-noise ratio from any of the valid image signal-to-noise ratios or invalid image signal-to-noise ratios above.

In an example, the system 400 can include receiving one or more additional images. The system 400 can save the one or more additional images to a database 412. The one or more additional images can include one or more additional validation images. The system 400 can include setting a minimum number of additional validation images. The validation module 406 can include checking whether a number of additional validation images is less than the minimum number of additional validation images. In an example, the validation module 406 can include delaying determining validity of the image 402 when the number of additional validation images is less than the minimum number of additional validation images. Also, the validation module 406 can comprise determining validity of the image 402 from the signal-to-noise ratio when the number of additional validation images is not less than the minimum number of additional validation images.

In an example, the system 400 can include generating the image 402. The scanner 404 can include generating the image 402.

In an example, a signal-to-noise ratio can include a signal value comprising information from an image 402 or a validation image 408. The signal value can further comprise determining a brightness value for a portion of an image 402 or a validation image 408. A signal-to-noise ratio can also include a noise value comprising information from an image 402 or a validation image 408. For example, the signal value or the noise value can comprise a brightness value for a location in an image 402 or a validation image 408. The location can comprise a pixel. In an example, determining the brightness value can include determining a brightness correction and using the brightness correction to determine the brightness value. For example, the brightness correction can comprise normalizing the brightness value of a pixel using the brightness value of a portion of an image or an entire image. In an example, the signal value can comprise the root mean square of the brightness values of a locus of locations of the image 402 or the validation image 408. For example, the signal value can comprise the root mean square of the brightness values of one or more pixels of the image 402 or the validation image 408. In an example, the signal value can comprise the central tendency of the brightness values of a locus of locations of the image 402 or the validation image 408, wherein the central tendency can include a weighting factor for a specified location. In an example, the signal value can comprise the central tendency of the brightness values of one or more pixels of the image 402 or the validation image 408, wherein the central tendency can include a weighting factor for a specified pixel. A central tendency can include a root mean square.

In an example, the noise value can include information about a specified location, wherein, for example, the specified location can include a specified pixel. The information about a specified location can comprise a specified location noise value. The specified location noise value can include determining a difference between the brightness value of a specified location in the validation image 408 and the brightness value of a specified location in the image 402. The noise value can comprise the root mean square of one or more specified location noise values. The noise value can comprise the central tendency of one or more specified location noise values, wherein the central tendency can include a weighting factor for a specified location. In an example, the noise value can comprise a variance of the brightness value of one or more specified locations.

In an example, the signal-to-noise ratio can comprise a ratio of the signal value and the noise value. For example, the signal value can include the root mean square of the brightness values of one or more pixels in a validation image 408. The noise value can include the root mean square of one or more specified pixel noise values, wherein the one or more specified pixel noise values include determining a difference between the brightness value of a specified pixel in the validation image 408 and the brightness value of a specified pixel in the image 402. The brightness value of a specified location or a specified pixel can include a weighting factor for the specified location or the specified pixel.

Figure 5:
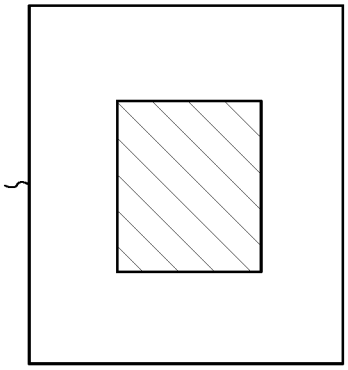
FIG. 5 illustrates generally an illustrative example of images and validation images.
Figure 5:
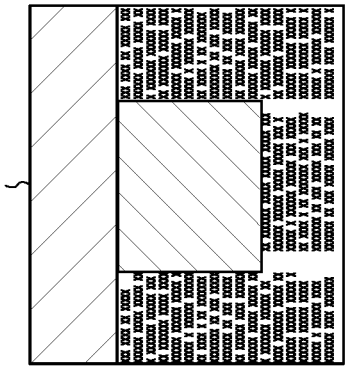
Figure 5:
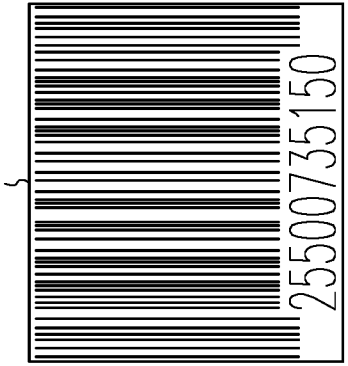
Figure 5:
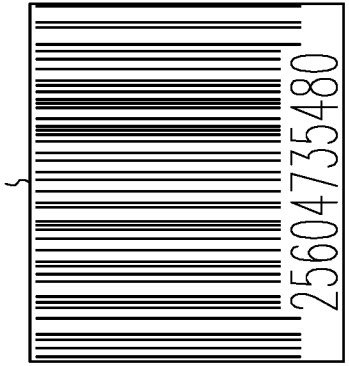
Figure 5:
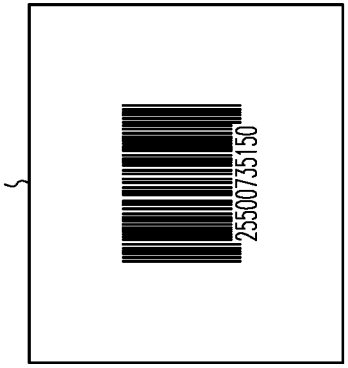
Figure 5:
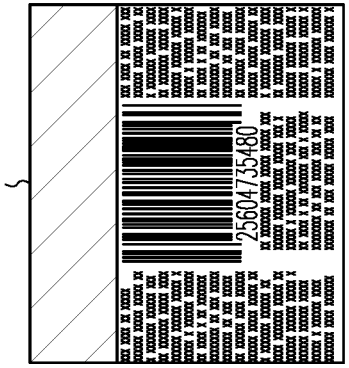

FIG. 5 illustrates generally an illustrative example of a series of images and validation images 500. In an example, the series of images and validation images 500 can include a cropped barcode image, such as a first cropped image 502A and a second cropped image 502B. The series of images and validation images 500 can include a barcode image, such as a first barcode image 504A and a second barcode image 504B. The first cropped image 502A can include the first barcode image 504A. The series of images and validation images 500 can include a cropped image comprising excluding a barcode from the image, such as a first final image 506A and a second final image 506B. The first final image 506A can include the first cropped image 502A comprising excluding the first barcode image 504A. In an example, the series of images and validation images 500 can include cropping an image to obtain a first cropped image 502A. The series of images and validation images 500 can also comprise cropping the first cropped image 502A to obtain the first barcode image 504A. The series of images and validation images 500 can also comprise excluding the first barcode image 504A from the first cropped image 502A to obtain the first final image 506A.

Figure 6:
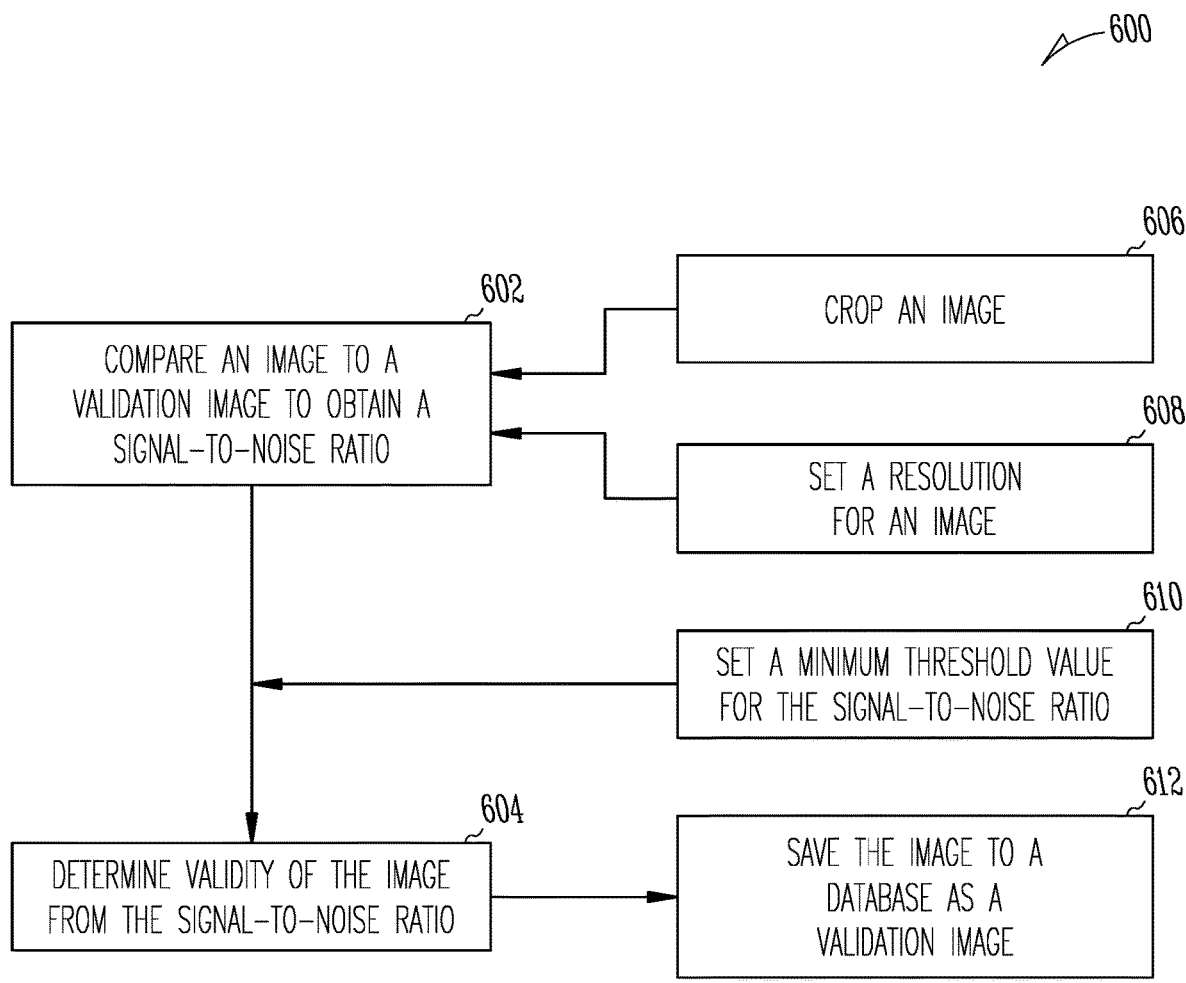
FIG. 6 illustrates generally a technique, such as a method, that can include determining validity of an image by a processor circuit.

FIG. 6 illustrates generally a technique 600, such as a method, that can include determining validity of an image by a processor circuit. In an example, the technique 600 compares an image to a validation image to obtain a signal-to-noise ratio 602 and determines validity of the image from the signal-to-noise ratio 604. The technique 600 can include cropping an image 606. The technique 600 can also include setting a resolution for an image 608. In an example, determining validity of the image from the signal-to-noise ratio can comprise setting a minimum threshold value for the signal-to-noise ratio 610. In an example, the technique 600 can include saving the image to a database as a validation image 612.

Figure 7:
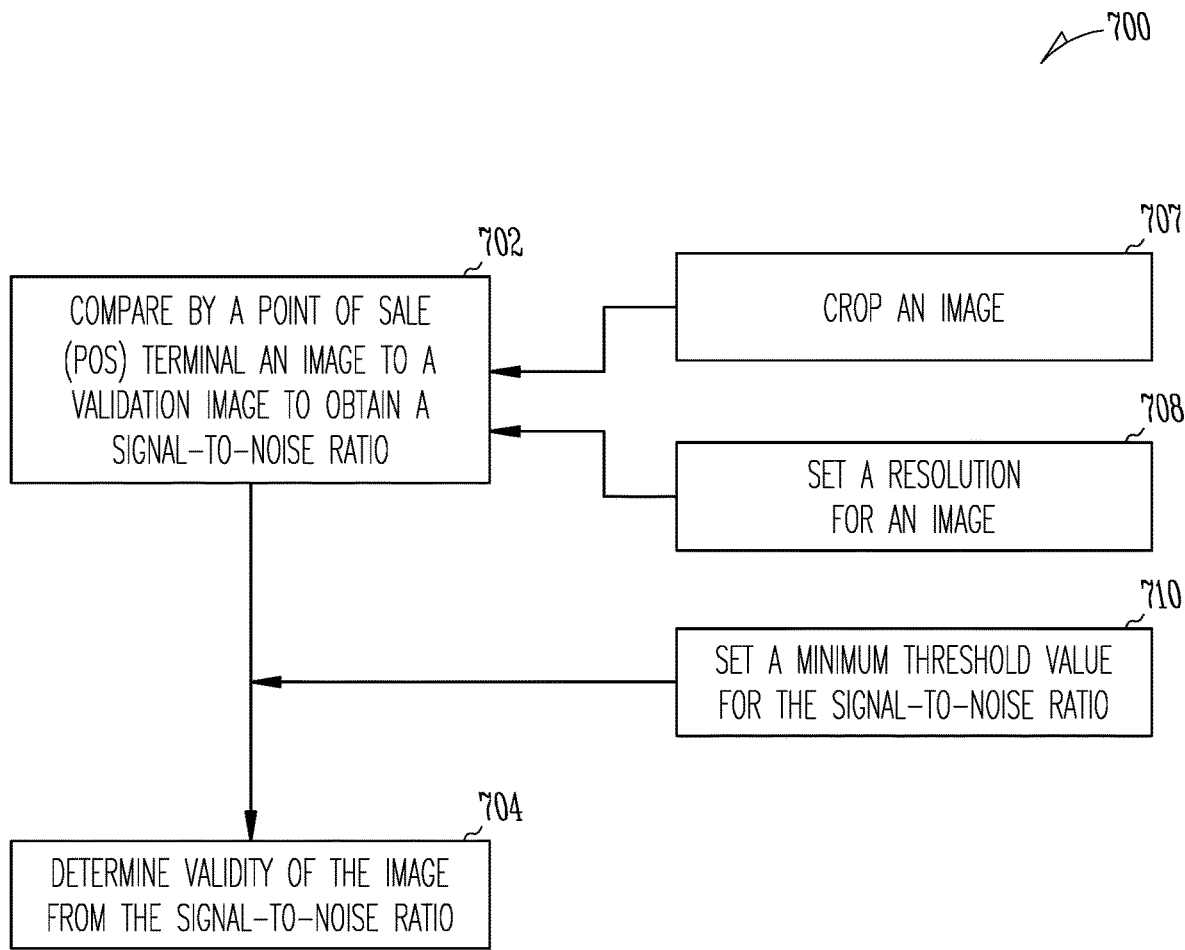
FIG. 7 illustrates generally a technique, such as a method, that can include determining validity of an image at a Point Of Sale (POS) terminal.

FIG. 7 illustrates generally a technique, such as a method, that can include determining validity of an image at a Point Of Sale (POS) terminal. In an example, the technique 700 compares, by a Point Of Sale (POS) terminal, an image to a validation image to obtain a signal-to-noise ratio 702 and determines validity of the image from the signal-to-noise ratio 704. The technique 700 can include cropping an image 707. The technique 700 can also include setting a resolution for an image 708. In an example, determining validity of the image from the signal-to-noise ratio can include setting a minimum threshold value for the signal-to-noise ratio 710.

Various Notes & Examples

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method, comprising:
   capturing an image;
   cropping the image by removing an entire machine readable code from the image to obtain a cropped image, wherein the cropped image includes a first area surrounding the machine readable code;
   comparing, by a processor circuit, the first area of the cropped image to a second area of a validation image to obtain a signal-to-noise ratio of the first area to the second area, wherein the second area of the validation image surrounds a validation machine readable code of the validation image;
   obtaining a predetermined threshold value, wherein the threshold value is determined from at least one signal-to-noise ratio for a valid image compared to the validation image and at least one signal-to-noise ratio for an invalid image compared to the validation image; and
   determining validity of the image by comparing the signal-to-noise ratio to the threshold value.

2. The method of claim 1, wherein the machine readable code includes a barcode.

3. The method of claim 1 further comprising, setting a resolution for the image prior to obtaining the signal-to-noise ratio.

4. The method of claim 1 further comprising, saving the image to a database as a validation image.

5. The method of claim 1 further comprising:
   comparing the image to a second validation image to obtain a second signal-to-noise ratio; and
   determining validity of the image from the signal-to-noise ratio and the second signal-to-noise ratio.

6. The method of claim 1 further comprising, receiving one or more additional images and saving the one or more additional images to a database as one or more additional validation images.

7. The method of claim 1 further comprising setting a minimum number of additional validation images.

8. The method of claim 7 further comprising:
   checking whether a number of additional validation images is less than the minimum number of additional validation images;
   delaying determining validity of the image when the number of additional validation images is less than the minimum number of additional validation images; and
   determining validity of the image from the signal-to-noise ratio when the number of additional validation images is not less than the minimum number of additional validation images.

9. A Point Of Sale (POS) system, comprising:
   a scanner configured to capture an image;
   a validation module to configured to:
   crop the image by removing an entire machine readable code from the image to obtain a cropped image, wherein the cropped image includes a first area surrounding the machine readable code;
   compare the first area of the cropped image to a second area of a validation image to produce a signal-to-noise ratio of the first area to the second area, wherein the second area of the validation image surrounds a validation machine readable code of the validation image;
   obtain a predetermined threshold value, wherein the threshold value determined from at least one signal-to-noise ratio for a valid image compared to the validation image and at least one signal-to-noise ratio for an invalid image compared to the validation image; and
   determine validity of the image by comparing the signal-to-noise ratio to the threshold value.

10. The system of claim 9, wherein the machine readable code includes a barcode.

11. A method, comprising:

capturing an image;

cropping the image by removing an entire machine readable code from the image to obtain a cropped image, wherein the cropped image includes a first area surrounding the machine readable code;

comparing, by a Point Of Sale (POS) terminal, the first area of the cropped image to a second area of a validation image to obtain a signal-to-noise ratio of the first area to the second area, wherein the second area of the validation image surrounds a validation machine readable code of the validation image;

obtaining a predetermined threshold value, wherein the threshold value is determined from at least one signal-to-noise ratio for a valid image compared to the validation image and at least one signal-to-noise ratio for an invalid image compared to the validation image; and determining validity of the image by comparing the signal-to-noise ratio to the threshold value.

12. The method of claim 11, wherein the machine readable code includes a Quick Response (QR) code.

13. The method of claim 11 further comprising:

setting a threshold value for the signal-to-noise ratio; and determining the validity of the image by using the threshold value.

14. The method of claim 11, further comprising manipulating the image to reduce glare from the image.

* * * * *